(12) United States Patent
Kim et al.

(10) Patent No.: US 8,256,837 B2
(45) Date of Patent: Sep. 4, 2012

(54) REAR MONITOR MOUNTING STRUCTURE INTEGRATED WITH ARMREST

(75) Inventors: Hun Soo Kim, Whasung-Si (KR); Yong Ho Noh, Hwaseong-si (KR); June Kyu Park, Hwaseong-si (KR); Hee Sang Park, Hwaseong-si (KR); Jung Hwan Yun, Seoul (KR); Hyun Kim, Hwaseong-si (KR); Hee Jun Jeong, Whasung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 403 days.

(21) Appl. No.: 12/623,133

(22) Filed: Nov. 20, 2009

(65) Prior Publication Data

US 2011/0049924 A1  Mar. 3, 2011

(30) Foreign Application Priority Data

Aug. 31, 2009 (KR) .................. 10-2009-0081396

(51) Int. Cl.
*A47C 7/62* (2006.01)
(52) U.S. Cl. ............ 297/188.16; 297/217.3; 348/837
(58) Field of Classification Search ........... 297/188.14, 297/188.15, 188.16, 188.19, 217.3; 296/24.34, 296/37.8; 348/837
See application file for complete search history.

(56) References Cited

U.S. PATENT DOCUMENTS

| 6,494,527 B1 * | 12/2002 | Bischoff ................. 296/208 |
| 6,816,177 B2 * | 11/2004 | Wang et al. ............. 345/156 |
| 6,890,012 B2 | 5/2005 | Maierholzner |
| 6,997,494 B2 * | 2/2006 | Neumann ............... 296/1.09 |
| D535,609 S * | 1/2007 | Vitito ...................... D12/421 |
| D535,937 S * | 1/2007 | Vitito ...................... D12/421 |
| D535,957 S * | 1/2007 | Vitito ...................... D14/132 |
| 7,201,416 B2 | 4/2007 | Rist |
| D543,930 S * | 6/2007 | Vitito ...................... D12/421 |
| D551,197 S * | 9/2007 | Vitito ...................... D14/129 |
| D581,381 S * | 11/2008 | Vitito ...................... D14/132 |
| 7,604,291 B2 * | 10/2009 | Vitito ................... 297/188.19 |
| 7,802,835 B2 * | 9/2010 | Vitito ...................... 296/37.8 |
| 7,830,460 B2 * | 11/2010 | Ido ............................ 348/837 |
| 7,857,382 B2 * | 12/2010 | Vitito ..................... 297/217.3 |
| 7,871,115 B2 * | 1/2011 | Vitito et al. ............... 296/37.8 |
| 8,070,224 B2 * | 12/2011 | Vitito ..................... 297/217.3 |

(Continued)

FOREIGN PATENT DOCUMENTS

JP  2007-308124 A  11/2007

(Continued)

*Primary Examiner* — David Dunn
*Assistant Examiner* — David E Allred
(74) *Attorney, Agent, or Firm* — Morgan, Lewis & Bockius LLP

(57) ABSTRACT

A rear monitor mounting structure may include an armrest having a recess formed in an upper portion and an armrest hinge portion provided on one end thereof, a rear monitor mount provided in the one end of the armrest and pivotally coupled to the armrest hinge portion of the armrest, a vertical rotary motor fixed to the armrest hinge portion and coupled to the rear monitor mount to selectively rotate the rear monitor mount, wherein the vertical rotary motor is co-axially aligned with an armrest hinge shaft pivotally coupling the armrest and a center console, and a rear monitor connected to the rear monitor mount, wherein the rear monitor rotates toward or away from the recess according to a rotation angle of the rear monitor mount with respect to the armrest hinge shaft.

5 Claims, 3 Drawing Sheets

U.S. PATENT DOCUMENTS

| | | | |
|---|---|---|---|
| 2002/0149708 A1* | 10/2002 | Nagata et al. | 348/837 |
| 2002/0163215 A1* | 11/2002 | Emerling et al. | 296/24.1 |
| 2003/0234550 A1* | 12/2003 | Brooks et al. | 296/24.1 |
| 2005/0190308 A1* | 9/2005 | Chen | 348/837 |
| 2006/0119151 A1* | 6/2006 | Vitito | 297/217.3 |
| 2007/0132894 A1* | 6/2007 | Vitito | 348/837 |
| 2011/0193374 A1* | 8/2011 | Kim | 297/188.16 |

FOREIGN PATENT DOCUMENTS

| | | |
|---|---|---|
| KR | 1998-052287 U | 10/1998 |
| KR | 1999-0025209 U | 7/1999 |
| KR | 2002-0049498 A | 6/2002 |
| KR | 10-2004-0016577 A | 2/2004 |
| KR | 10-0792899 B1 | 1/2008 |
| WO | WO 2006/115855 A2 | 11/2006 |

* cited by examiner

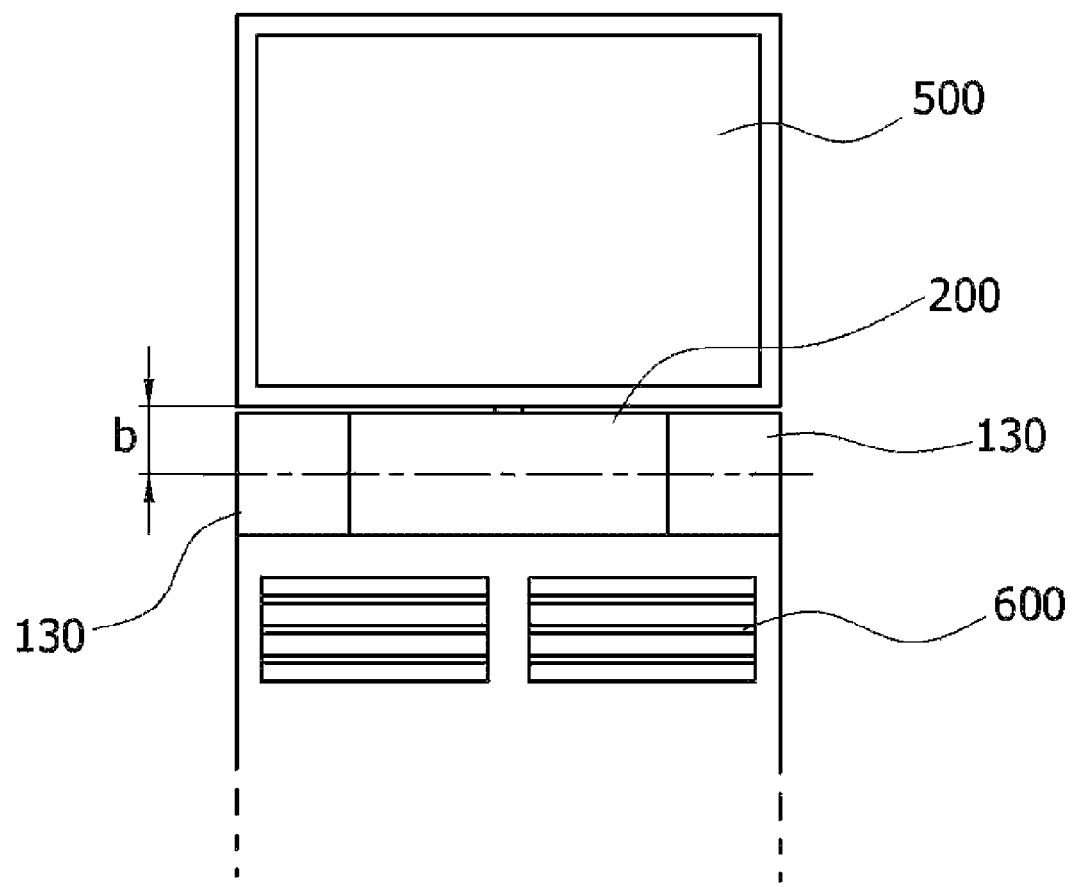

REAR MONITOR MOUNTING STRUCTURE INTEGRATED WITH ARMREST

CROSS REFERENCE TO RELATED APPLICATION

The present application claims priority to Korean Patent Application Number 10-2009-0081396 filed on Aug. 31, 2009, the entire contents of which application is incorporated herein for all purposes by this reference.

BACKGROUND OF THE INVENTION

1. Field of the Invention

The present invention relates to a rear monitor mounting structure integrated with an armrest, and in particular, to one which includes an armrest having a recess formed in the upper portion and an armrest hinge provided on one end, a rear monitor mount provided in the recess and rotatable about a shaft extending parallel with an armrest hinge shaft, a vertical rotary motor coupled to the armrest hinge, for rotating the rear monitor mount, and a rear monitor connected to the rear monitor mount, wherein the rear monitor rotates toward or away from the recess according to rotation angles of the rear monitor mount.

2. Description of Related Art

A car rear monitor is generally mounted on the rear side of a front seat or on a center console.

The rear monitor located on the rear side of the front seat provides a good view to only the passenger seated behind the front seat, but the other rear seat passengers have difficulty in watching the rear monitor.

FIG. 1 is a conventional rear monitor mounting structure. Referring to FIG. 1, a rear monitor 50 mounted on the rear part of the center console 10 can provide convenience to all rear seat passengers. However, this configuration still has several problems.

First, it is difficult to utilize the space around the center console 10 since a separate bracket 20, on which the rear monitor 50 is mounted, is provided on the rear part of the center console 10. In addition, the load of torque for driving the rear monitor 50 has to be increased when the rear monitor 50 is in use since the rear monitor 50 is spaced at a predetermined distance "a" from the rotary shaft in order to not obstruct an outlet port 60 of an air conditioner duct for the rear seat passenger. Accordingly, the capacity of the motor is inevitably enhanced, and noise is increased.

Second, aesthetic appearance is negatively affected and installation is cumbersome since the rear monitor is mounted separate from the armrest.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide a rear monitor mounting structure integrated with an armrest, which can more efficiently utilize the space around a center console, minimize a drive motor of a rear monitor, and reduce noise.

There is also provided a rear monitor mounting structure integrated with an armrest, which has an excellent aesthetic appearance and can be easily provided in a module since a rear motor is provided integrally with the armrest.

In an aspect of the invention, the rear monitor mounting structure, may include an armrest having a recess formed in an upper portion and an armrest hinge portion provided on one end thereof; a rear monitor mount provided in the one end of the armrest and pivotally coupled to the armrest hinge portion of the armrest; a vertical rotary motor fixed to the armrest hinge portion and coupled to the rear monitor mount to selectively rotate the rear monitor mount, wherein the vertical rotary motor is co-axially aligned with an armrest hinge shaft pivotally coupling the armrest and a center console; and a rear monitor connected to the rear monitor mount, wherein the rear monitor rotates toward or away from the recess according to a rotation angle of the rear monitor mount with respect to the armrest hinge shaft.

The rear monitor mounting structure may further include a planetary gearing, a portion of which is fixed to the inner circumference of the rear monitor mount, wherein the planetary gearing is meshed with a drive shaft of the vertical rotary motor to rotate the rear monitor mount with respect to the armrest hinge shaft.

The rear monitor mounting structure may further include a first rotary gear fixed to the rear monitor and a second rotary gear fixed to a horizontal rotary motor fixed to the rear monitor mount, wherein the first and second rotary gears are rotatably coupled to the rear monitor mount, and the first and second rotary gears and the horizontal rotary motor are provided inside the rear monitor mount, and wherein a rotary shaft of the first rotary gear is coupled to the rear monitor and extends perpendicular to the armrest hinge shaft toward the rear monitor mount.

The horizontal rotary motor may be aligned in parallel to the armrest hinge shaft and rotates the second rotary gear to actuate the first rotary gear.

The first and second rotary gears may include a bevel gear with teeth formed on the outer circumference thereof to be meshed each other, and a rotary shaft of the second rotary gear is aligned to be perpendicular to a rotary shaft of the first rotary gear.

According to various aspects of the present invention, the rear monitor mounting structure integrated with an armrest has the following advantageous effects.

First, the space around the center console can be utilized more efficiently, the drive motor of the rear monitor can be miniaturized, and noise can be reduced.

Second, since the rear monitor is integrally provided with the armrest, the rear monitor mounting structure has an excellent aesthetic appearance and can be easily provided in a module.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 4 is a front elevation view of the rear monitor mounting structure integrated with an armrest shown in FIG. 2, viewed from a rear seat, when the rear monitor is in use.

Figure 1:
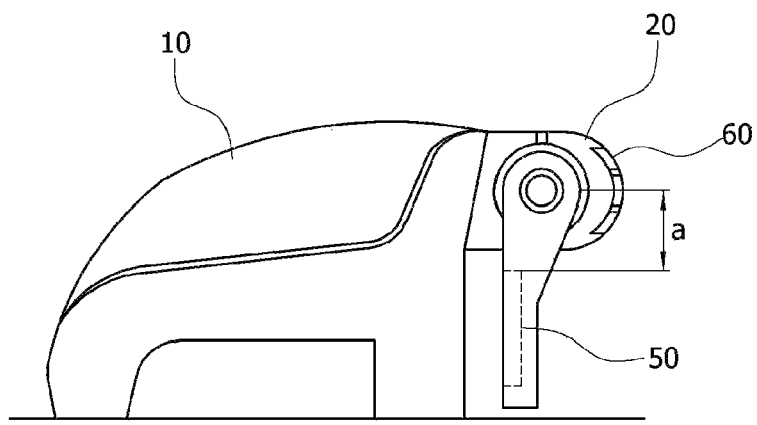
FIG. 1 is a conventional rear monitor mounting structure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
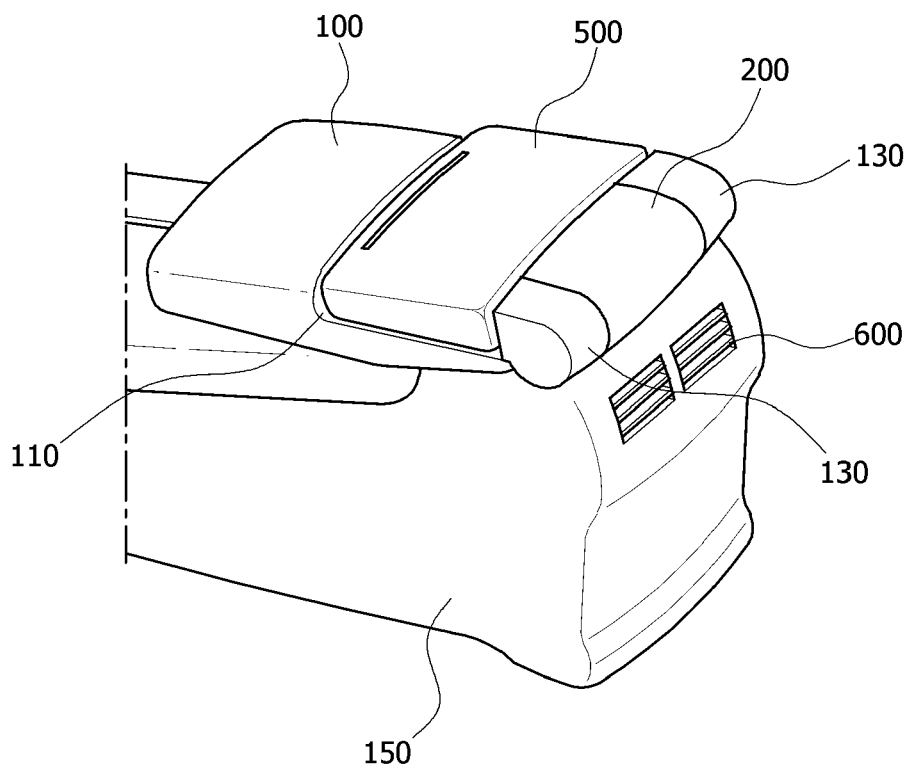
FIG. 2 is a perspective view illustrating a rear monitor mounting structure integrated with an armrest in accordance with an exemplary embodiment of the invention.
Figure 3:
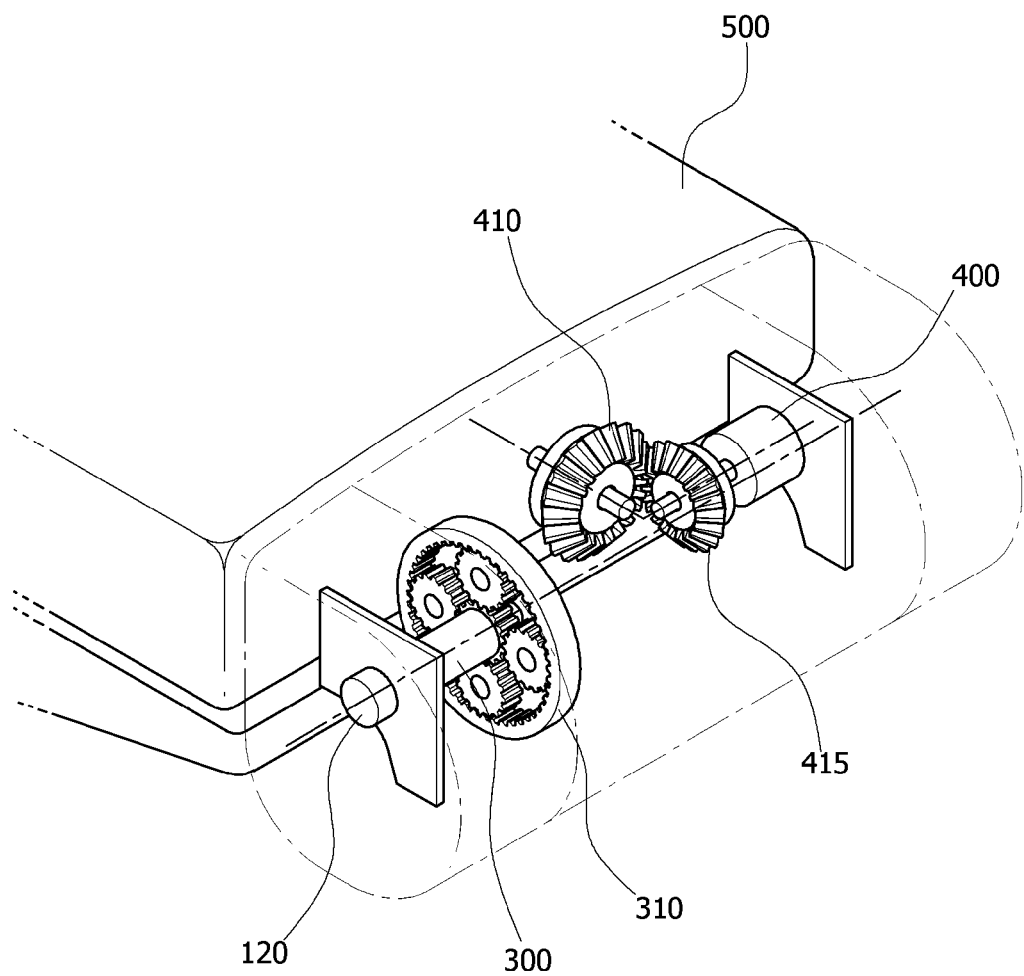
FIG. 3 is an enlarged view of the rear monitor mount of the rear monitor mounting structure integrated with an armrest shown in FIG. 2.

FIG. 2 is a perspective view illustrating a rear monitor mounting structure integrated with an armrest in accordance with an exemplary embodiment of the invention, FIG. 3 is an enlarged view of the rear monitor mount of the rear monitor mounting structure integrated with an armrest shown in FIG. 2, and FIG. 4 is a front elevation view of the rear monitor mounting structure integrated with an armrest shown in FIG. 2, viewed from a rear seat, when the rear monitor is in use.

The rear monitor mounting structure integrated with an armrest in accordance with an exemplary embodiment of the invention includes an armrest 100, a rear monitor mount 200, a vertical rotary motor 300, and a rear monitor 500. The armrest 100 has a recess 110 in the top portion thereof and armrest hinge portions 130 on one end thereof.

The rear monitor mount 200 is provided in the recess 110, and is rotatable about a rotary shaft extending parallel with the armrest hinge 120. The vertical rotary motor 300 is coupled with the armrest hinge portions 130 and serves to rotate the rear monitor mount 200. The rear monitor 500 is connected to the rear monitor mount 200. The rear monitor 500 rotates toward or away from the recess 110 according to the rotation angle of the rear monitor mount 200.

According to the conventional art, the center console is equipped with the separate bracket 20 such that the rear monitor 50 can be mounted on the center console. In contrast, the rear monitor mounting structure in accordance with an exemplary embodiment of the invention allows the rear monitor 500 to be directly installed in the armrest 100, thereby efficiently using the space around the center console when compared to the conventional art.

In addition, the recess 110 capable of receiving the rear monitor 500 therein is formed in the armrest 100. Since the rear monitor 500 can rotate toward or away from the recess 110 according to the rotation angle of the rear monitor mount 200, the use of the space around the center console can be advantageously maximized.

In the conventional art, as shown in FIG. 1, the rear monitor 50 is spaced at a predetermined distance "a" from the rotary shaft. This, however, disadvantageously increases torque for driving the rear monitor 50 when the rear monitor 50 is in use. In contrast, as shown in FIG. 4, in accordance with an exemplary embodiment of the invention, the rear monitor 500 is spaced at a very small distance "b" from the rotary shaft. This configuration can reduce the amount of torque required for the rear monitor 500 when compared to the conventional art. As a result, the size of the motor can be reduced.

Support brackets (not shown) are provided on both ends of the armrest 100, protruding from the center console 152 inside the armrest hinge portions 130. The armrest hinge shaft 120 is rotatably coupled with the support brackets. Accordingly, in the case where the armrest 100 is raised, it can be rotated about the armrest hinge shaft 120.

The body of the vertical rotary motor 300 is fixed to the armrest hinge 130, and the drive shaft of the vertical rotary motor 300 is coupled to the rear monitor mount 200. Thus, even if the drive shaft of the vertical rotary motor 300 is rotating, the armrest hinge portions 130, to which the body of the vertical rotary motor 300 is coupled, can remain fixed without rotation. At the same time, the rear monitor mount 200 coupled with the drive shaft of the vertical rotary motor 300 can rotate in parallel with the armrest hinge shaft 120.

A planetary gearing 310 is provided on the inner circumference of the rear monitor mount 200. The planetary gearing 310 is meshed with the drive shaft of the vertical rotary motor 300.

As shown in FIG. 3, in accordance with an exemplary embodiment of the invention, the planetary gearing 310 is used to rotate the rear monitor mount 200. The planetary gearing 310 can provide stable rotation and reduce the amount of load applied to each gear due to its structure, in which all gears are meshed with each other. When compared to other gear systems, the planetary gearing 310 advantageously occupies a relatively smaller space in order to transfer the same amount of rotation force.

As a result, since the distance "b" between the rear monitor 500 and the rotary shaft is reduced and the planetary gearing 310 is mounted inside the rear monitor mount 200, the rear monitor mounting structure in accordance with an exemplary embodiment of the invention can produce at least the same power as or more power than the conventional structure does even if its motor generates a smaller amount of power. In addition, power consumption is reduced due to the miniaturization of the motor, space utilization is improved due to the use of the planetary gearing, and noise is reduced.

In addition, a first rotary gear 410, a second rotary gear 415, and a horizontal rotary motor 400 are provided inside the rear monitor mount 200. The first rotary gear 410 is fixedly coupled with the rear monitor 500, with a rotary shaft extending perpendicular to the armrest hinge shaft 120, and the horizontal rotary motor 400 serves to rotate the first rotary gear 410.

The rear monitor 500 is retracted into the armrest recess 110 when it is not in use. If the horizontal rotary motor 400 is not provided in the rear monitor mount 200, the rear monitor 500 can be rotated only in the protruding direction or the retracting direction by the vertical rotary motor 300. Accordingly, the rear monitor 500 is retracted into the armrest recess 110 with a liquid crystal panel (not shown) facing a vehicle body roof (not shown) when it is not in use.

In this case, however, the liquid crystal panel of the rear monitor 500 may be accidentally damaged by the passenger since the liquid crystal panel is exposed to the outside.

In order to solve the foregoing problem, the first rotary gear 410 fixedly coupled to rear monitor 500, with a rotary shaft of the first rotary gear 410 extending perpendicular to the armrest hinge shaft 120, and the horizontal rotary motor 400 fixed to the second rotary gear 410 rotating the first rotary gear 410 are provided inside the rear monitor mount 200.

Due to this configuration, the rear monitor 500 can rotate in the direction perpendicular to the armrest hinge shaft 120 during retraction into the recess 110, and the liquid crystal panel of the rear monitor 500 can face downwards after retraction into the recess 110. This, as a result, can protect the liquid crystal display of the monitor 500 and improve aesthetic appearance.

The first and second rotary gears 410 and 415 are a bevel gear having teeth formed on the outer circumference thereof. The horizontal rotary motor 400 has a rotary shaft extending perpendicular to that of the bevel gear and teeth formed on the outer circumference thereof, corresponding to those of the bevel gear.

The first rotary gear 410 having the rotary shaft perpendicular to the armrest hinge shaft 120 is attached to the underside of the rear monitor 500, and the horizontal rotary motor 400 fixed to the second rotary gear 415 for rotating the first rotary gear 410 is provided in the rear monitor mount 200. If the first and second rotary gear 410 and 415 were a spur gear, the rotating part of the horizontal rotary motor 400 will be in the shape of a spur gear, corresponding to the rotary gear. As a result, the rotary shaft of the horizontal rotary motor will be perpendicular to the armrest hinge shaft 120.

However, the configuration of the rotary shaft of the rear monitor mount 200, on which the horizontal rotary motor 400 is provided, arranged to be parallel to the armrest hinge shaft 120 leads to a structural problem: the monitor mount 200 and the horizontal rotary motor 400 may collide into each other if the shaft of the horizontal rotary motor 400 were perpendicular to the armrest hinge shaft 120 as described above. In addition, the space inside the rear monitor mount 200 is not efficiently used.

Accordingly, in accordance with an exemplary embodiment of the invention, the first rotary gear 410 is constructed as a bevel gear with teeth formed on the outer circumference thereof, and the rotating part of the horizontal rotary motor 400 is also provided with the second rotary gear 415 having teeth corresponding to those of the first rotary gear 410 (i.e., the bevel gear). Then, the horizontal rotary motor 400 is provided such that the rotary shaft thereof extends perpendicular to the rotary shaft of the first rotary gear 410 (i.e., the bevel gear).

Due to the above-described configuration, the rotary shaft of the horizontal rotary motor 400 is provided in parallel to the armrest hinge shaft 120. This, as a result, makes it possible to prevent harmful contact between the rear monitor mount 200 and the horizontal rotary motor 400 as well as to enhance the utilization of the space inside the rear monitor mount 200.

The rotary shaft of the vertical rotary motor 300 and the armrest hinge shaft 120 can be arranged on the same line.

Since the rotary shaft of the vertical rotary motor 300 is coaxial with the rotary shaft of the rear monitor mount 200, the rotary shaft of the vertical rotary motor 300 can be arranged on the same line as the armrest hinge shaft 120.

Due to the above-described configuration, the armrest 100 and the rear monitor 500 can be easily provided in a module and the number of parts to be used is reduced, thereby reducing manufacturing costs.

For convenience in explanation and accurate definition in the appended claims, the term "upper" is used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear monitor mounting structure, comprising:
    an armrest having a recess formed in an upper portion and an armrest hinge portion provided on one end thereof;
    a rear monitor mount provided in the one end of the armrest and pivotally coupled to the armrest hinge portion of the armrest;
    a vertical rotary motor fixed to the armrest hinge portion and coupled to the rear monitor mount to selectively rotate the rear monitor mount, wherein the vertical rotary motor is co-axially aligned with an armrest hinge shaft pivotally coupling the armrest and a center console; and
    a rear monitor connected to the rear monitor mount, wherein the rear monitor rotates toward or away from the recess according to a rotation angle of the rear monitor mount with respect to the armrest hinge shaft.

2. The rear monitor mounting structure in accordance with claim 1, further including a planetary gearing, a portion of which is fixed to an inner circumference of the rear monitor mount, wherein the planetary gearing is meshed with a drive shaft of the vertical rotary motor to rotate the rear monitor mount with respect to the armrest hinge shaft.

3. The rear monitor mounting structure in accordance with claim 1, further including a first rotary gear fixed to the rear monitor and a second rotary gear fixed to a horizontal rotary motor fixed to the rear monitor mount,
    wherein the first and second rotary gears are rotatably coupled to the rear monitor mount, and the first and second rotary gears and the horizontal rotary motor are provided inside the rear monitor mount, and
    wherein a rotary shaft of the first rotary gear is coupled to the rear monitor and extends perpendicular to the armrest hinge shaft toward the rear monitor mount.

4. The rear monitor mounting structure in accordance with claim 3, wherein the horizontal rotary motor is aligned in parallel to the armrest hinge shaft and rotates the second rotary gear to actuate the first rotary gear.

5. The rear monitor mounting structure in accordance with claim 3, wherein
    the first and second rotary gears include a bevel gear with teeth formed on the outer circumference thereof to be meshed with each other, and
    wherein a rotary shaft of the second rotary gear is aligned to be perpendicular to a rotary shaft of the first rotary gear.

* * * * *